United States Patent

[11] 3,542,252

| | | |
|---|---|---|
| [72] | Inventor | Fredric S. Miller<br>15 Mayfair Drive, Wayne, New Jersey 07470 |
| [21] | Appl. No. | 729,180 |
| [22] | Filed | May 15, 1968 |
| [45] | Patented | Nov. 24, 1970 |

[54] DISPENSING DEVICE FOR GRANULAR MATERIAL
2 Claims, 5 Drawing Figs.

[52] U.S. Cl. .................................................. 222/284, 222/370
[51] Int. Cl. ...................................................... G01f 11/24
[50] Field of Search ........................................... 222/284, 370, 436, 452

[56] References Cited
UNITED STATES PATENTS

| 2,002,039 | 5/1935 | McPhee | 222/284X |
| 2,904,230 | 9/1959 | Worth | 222/452 |
| 3,007,612 | 11/1961 | Tepper | 222/284 |
| 3,211,334 | 10/1965 | McShea | 222/39 |

Primary Examiner—Robert B. Reeves
Assistant Examiner—Frederick R. Handren
Attorney—Hyman Jackman ABSTRACT: A dispensing device adapted for permanent attachment to an end of a preferably round container of salt, or similar granular material, said device comprising an arcuate shield or gate that overstands an arcuate opening in the container end, and a volumetric dispenser, in part enclosed by the shield, and rotational on the center of which the curvature of the shield and dispenser are generated, the dispenser having a series of preferably equal openings which fill with material from the container. Said openings, when the volumetric dispenser is moved, consecutively moving out of register with the arcuate opening in the container end and out of enclosure by the shield to, thereby, dispense the material therein consecutively, while the container is inverted. The openings of the dispenser may be refilled by retracting the dispenser to initial position. Upending the container results in return of material from the dispenser to the container.

Patented Nov. 24, 1970
3,542,252
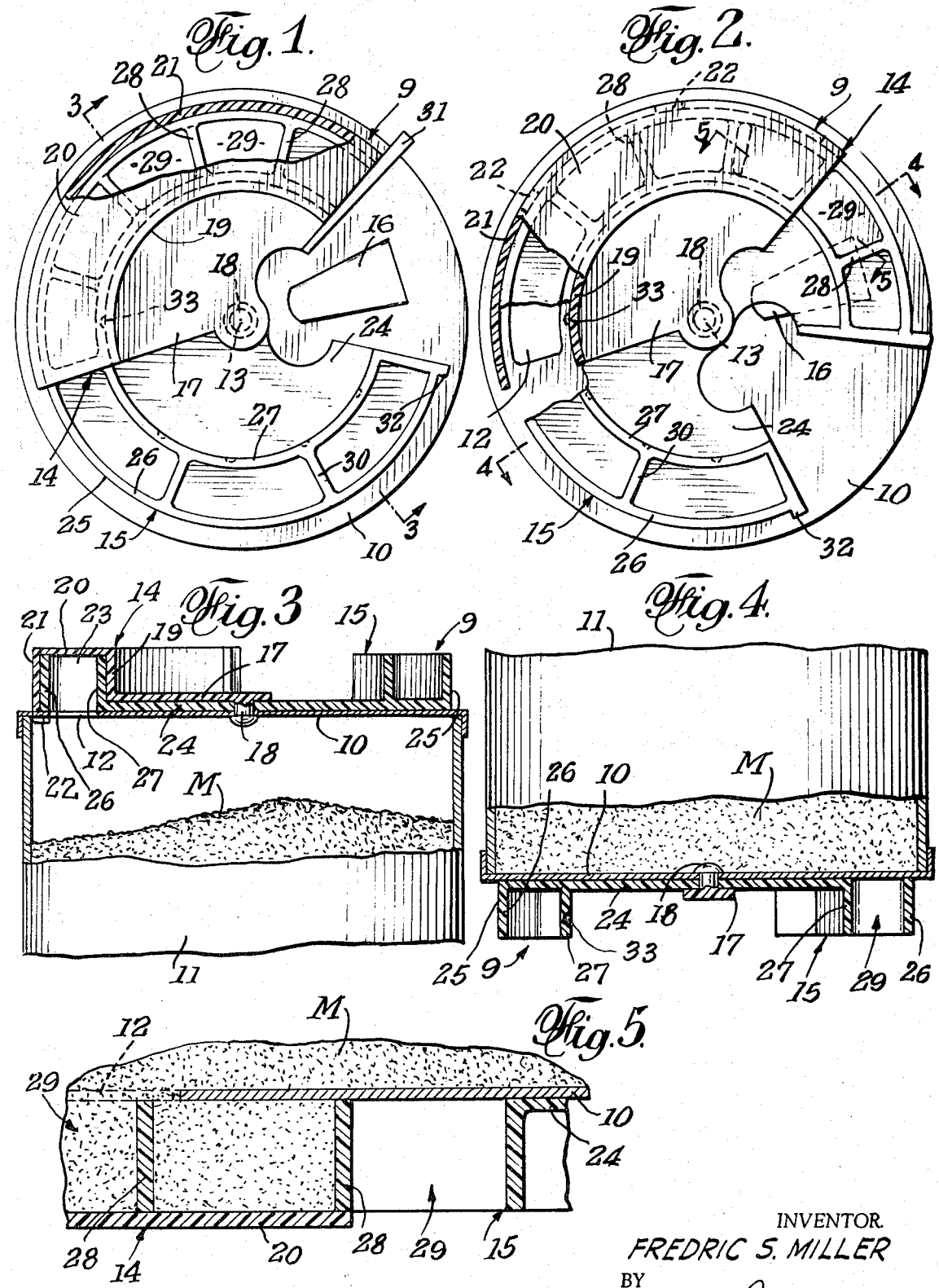
INVENTOR.
FREDRIC S. MILLER
BY
Hyman Jackman
ATTORNEY 3,542,252

DISPENSING DEVICE FOR GRANULAR MATERIAL

BACKGROUND OF THE INVENTION

The invention, while capable of other uses, such as dispensing tooth paste, soap, ground coffee, and other such comminuted materials, is more particularly devised for application to containers of granular material of which salt is the prime example, it being an object of this invention to provide a volumetric dispenser that, at the option of the user, may dispense one or more measured quantities of such material in a simple and expeditious manner.

As a result of an extended search of the prior United States art, the following patents, among several others not particularly in point, were located as of interest: U.S. Pat. Nos. 2,515,735, July 1950 Saunders, 3,211,334 Oct. 1965 McShea, 3,308,995 Mar. 1967 Lee et al.

Saunders has plural material-receiving cavities of different volumetric size which require to be preselected by positioning a selector valve disc or shutter, accordingly. Each time a different quantity is desired to be dispensed, the device requires readjustment of the selector disc.

McShea discloses a dispenser that is devised for stationary, inverted use and in which two elements—a shutter-aperture member, at the bottom of a measuring body, and a member with an orifice gate, at the top—move together relative to two material-holding openings in said body. This device has a base body of such thickness so that holes therein may be provided as measuring openings.

Lee et al. shows a volumetric determinator that is stationary, and has a shutter and gate orifice, one above and one below a compartmented tubular member. Rotation in either direction causes dispensing and, therefore, is dependent, for proper volumetric use, on the operator of the device.

Another object of the invention is to provide a dispensing device of the character above referred to that is adapted to be mounted on the top end of a dispenser of flowable, granular material and which has a discharge opening from which the material in the dispenser may be poured, when the container is inverted, said device simply comprising two elements—an arcuate shield affixed to the container top and in overstanding relation to said opening, and a manually-rotational volumetric determinator of larger arcuate extent than the shield and with a plurality of material-receiving openings that, with the container inverted, fill with material from the container and dispense the same, consecutively, as the determinator is advanced arcuately.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes one embodiment of the present invention, which is given by way of illustration or example only.

SUMMARY OF THE INVENTION

The present dispensing means 9 is adapted for mounting on an end cover 10 of a container 11 which holds granular or like flowable material M. Said end 10, preferably formed of sheet metal or plastic, is fixedly secured as a permanent part of the container. For the purpose of this invention said cover is provided with an arcuate opening 12 the curvature of which is generated on the center 13 of said cover. The cylindrical form of the container shown is desired but the shape thereof may be varied.

The dispensing means 9 comprises, generally, a shield 14 that is fixedly mounted on the cover 10, and a volumetric determinator 15 rotationally movable relative to the shield between nondispensing and dispensing positions.

BRIEF DESCRIPTION OF THE DRAWING

FIG. 1 is a top plan view of a dispensing device according to the present invention, the same being shown in normal closed position and with a portion partly in section.

FIG. 2 is a similar view showing the device in one dispensing position thereof.

FIG. 3 is a vertical sectional view as taken on the line 3–3 of FIG. 1, the container mounting the device being in initial reverted position.

FIG. 4 is a vertical sectional view as taken on the line 4–4 of FIG. 2, the container being in inverted position.

FIG. 5 is an enlarged sectional view as taken on the line 5–5 of FIG. 2.

DESCRIPTION OF THE PREFERRED EMBODIMENT

The container 11 is shown as a typically cylindrical container such as holds salt for being normally dispensed in indeterminate amounts through a conventional pour spout 16 provided in the cover 10.

The shield 14 and the determinator 15 of the dispensing means 9 may be made of any suitable, lightweight and inexpensive material, an example of which is a synthetic resin such as polystyrene having good impact resistance.

The shield 14 is shown as having a plate portion 17 with a peripheral edge and provided with a pivot member 18 at the point of generation of said edge, an arcuate wall 19 normal to said plate portion 17 and coextensive with said edge, an arcuate plate portion 20 coextensive with said wall 19 and offset from the plate portion 17 and having an outer peripheral edge, an arcuate wall 21 extending from said peripheral edge of the plate portion 20 in parallel and coplanar register with the wall 19, and a plurality of circumferentially spaced cover-engaging tabs 22 on the edge of wall 21 that is opposite to the edge joined with the plate 20. As best seen in FIG. 3, the walls 19 and 21, and the plate portion form an arcuate inverted channel 23, open at both ends, when the shield 14 is mounted on the cover 10, the plate portion 17 by its tabs 22 and by the pivot member 18 thereon, the latter comprising a connection with the center of the container cover. The arcuate extent of the shield may vary as required. In this case it is shown as approximately 150°.

The volumetric determinator 15 is shown as having a base plate 24 with a peripheral edge 25 of radial size to slidingly fit within the channel 23 and against the inner face of the wall 21 of the shield when connected, as shown, to the pivot member 18, outer and inner parallel and arcuate walls, respectively 26 and 27, radially spaced to fit between the walls 19 and 21 of the channel 23, and two or more radial walls 28 connecting the arcuate walls 26 and 27 to form one or more openings 29 which, due to omission of portions of plate 24 within the confines of said radial walls 28 and the portions of the walls 26 and 27 joined thereto, are open top to bottom, as seen in FIGS. 3, 4 and 5. All other portions of the determinator plate, between the arcuate walls 26 and 27, may be provided with radial walls 30 to serve as stiffeners. The arcuate extent of the determinator, between two top lugs 31 and 32 thereon, may also vary, as required. For a determinator having four material-receiving openings 29 of an arcuate extent of approximately 120°, as in FIG. 1, the arcuate extent of the determinator shown will approximate 330° when used in combination with the above described shield.

The shield 14 is so located on the cover 10 as to leave the pouring spout 16 exposed for use thereof when the determinator is in the closed position of FIG. 1. The shield, relative to the arcuate opening 12 in the cover, is mounted on the cover so that the four openings in the determinator 15, through their 120° extent, are coextensive with the opening 12. Also, the 30° excess of arcuate extent of the shield over that of the arcuate extent of the four openings, is arranged to be at that end of the shield with which the determinator stop 31 is engaged.

In cases where two or more openings 29 are provided, the dispensing positions of the determinator, i.e., positions wherein the same is advanced from the closed position of FIG.

1 to a dispensing position, as in FIG. 2, detent means 33 may be provided to releasably stop the determinator advance for each dispensing position.

OPERATION

For casual dispensing of salt, the pouring spout may be used in the usual way. However, for dispensing of measured quantities of salt, such as one-quarter, one-half, three-quarters, and one teaspoonful, the four openings will each be proportioned to hold a one-quarter teaspoonful.

By inverting the container, while in the closed position of FIG. 1, salt will pour from the interior of the container through the opening 12 in the cover 10 and into the four openings 29 which are in register with said opening 12, the shield plate portion 20 comprising the bottom, as in FIG. 5, for salt thus poured.

Now, if only the contents of the opening 29 nearest the stop 31 is to be dispensed, the determinator 15 is advanced to the first detent means 33, as in FIGS. 2 and 4 wherein said first opening 29 is offset from the shield plate portion 20 so the contents of said opening 29 is dispensed. In said offset position, the dispensing opening 29 is in register with the cover 10 which cuts off refilling of this opening. In the same manner, the successive openings 29 may be moved to dispensing position until all are emptied. It will be evident that less than all of the measured quantities of salt may be dispensed, merely by returning the determinator to closed position at any time and reverting the container to its initial position, as in FIG. 1, whereby all salt not dispensed will fall back into the container.

It will be noted that the arcuate proportions of the shield, determinator, opening in the cover, and the location of the latter and the dispensing openings in the determinator, are such that, all the salt in the determinator is dispensed when the latter's arcuate advance is stopped by the stop lug 32 engaging the shield.

In this disclosure and in the claims, the term "salt" is intended to define such granular and/or powdered material that is pourable in the manner hereinabove explained.

While the foregoing has illustrated and described what is now contemplated to be best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

I claim:

1. A salt-dispensing device for securement to an end cover of a salt container, said cover having an arcuate opening therein, said device comprising:
    a. a shield provided with an inverted channel of greater extent than the arcuate opening in the container cover, and nonmovably connected to said cover in overstanding relation to said arcuate opening;
    b. a circumferentially movable volumetric determinator having a base wall pivotally connected to said shield at a portion thereof at the center of generation of the curvature of the inverted channel of said shield;
    c. said determinator being provided with an arcuate peripheral portion residing in the inverted channel of the shield with the base wall in contact engagement with the cover of the container, said peripheral portion of the determinator being of greater arcuate extent than the arcuate extent of the shield;
    d. at least one through opening in the arcuate peripheral portion of the determinator that, in one position of the latter, is in register with the opening in the container cover and, in a circumferentially moved position beyond an end of the channel of the shield, is in position to dispense salt entering thereinto through the cover opening when the container is inverted;
    e. at least one additional salt-holding and -dispensing opening provided in said arcuate peripheral portion of the determinator adjacent to the first-mentioned opening, said openings, successively, dispensing their contents as the same are moved beyond said end in the channel of the shield;
    f. two additional salt-holding and -dispensing openings in the arcuate peripheral portion of the determinator, said four openings being arranged in arcuate adjacency and successively dispensing their contents as the same move beyond said end in the channel of the shield; and
    g. the arcuate extent of the determinator being twice that of the shield, a stop on one end of the determinator engaging the mentioned edge of the shield when in nondispensing position, and a stop on the opposite end of the determinator engaging the opposite edge of the shield when in position to dispense the contents of all four of the openings.

2. A salt-dispensing device according to claim 1 in which the shield has an arcuate extent approximating 150°, the determinator has an arcuate extent approximating 300°, and the four openings in the determinator and the opening in the container cover each have an arcuate extent approximating 120°, and are substantially coextensive when the determinator is in initial, nondispensing position.